May 24, 1955 P. AUGUST 2,709,075
MIXING MACHINES, IN PARTICULAR CONCRETE MIXERS
Filed Feb. 28, 1952

INVENTOR.
PAUL AUGUST
BY

2,709,075

MIXING MACHINES, IN PARTICULAR CONCRETE MIXERS

Paul August, Buenos Aires, Argentina

Application February 28, 1952, Serial No. 273,821

12 Claims. (Cl. 259—178)

The invention relates to an improvement in mixing machines, in particular concrete mixers of the general type described in my copending application Ser. No. 177,509 (Patent No. 2,608,395). The latter comprises a shaft carrying a conveyor screw or worm followed by a mixing screw or worm working in an inclined trough, the materials to be mixed being fed to the conveyor screw in measured quantities from storage bins and being thereby upwardly conveyed to the mixing screw in such manner that such materials fill the inclined trough only approximately to a level disposed below the axis of the shaft. The structure assures a particularly good mixing effect by the provision of a mixing screw which has the form of a spirally-wound conveyor band supported on radial cross-bars or spokes and having in successive sections alternately inside and outside openings or cutouts. This mixing screw allows part of the treated mixture raised by each turn at each revolution of the screw to slip back in the mixing trough toward the immediately preceding turn.

In the practical operation of such mixing machines, it was found, particularly when hardening mixtures such as concrete are being dealt with, that incrustations tend to form on the sides of the mixing trough not swept by the edges of the screw, which not only impede subsequent cleaning but increase the power consumption of the machine because stones may become trapped between the screw and such incrustations requiring increased power to crush or destroy such incrustations so as to continue normal operation.

The invention overcomes this disadvantage by the provision of a mixing screw or worm comprising not less than two spirally-wound bands, the openings or cutouts on the outer edges of which are angularly displaced or staggered with respect to each other in such manner that the inner surface of the mixing trough is at all points continuously swept by the outer edge of at least one of the spiral bands. The edges of the mixing screw bands extending between the cut-out portions thereof approach closely to the inner surface of the mixing trough so as to be nearly in contact therewith, and it is therefore no longer possible for incrustations to form to any appreciable degree at any point on the inner surface of the mixing trough.

The above described operation may be obtained with a mixing screw or worm formed of only two bands but more than two such bands may of course be provided. The screw or worm may be formed of a number of spade-shaped blades of sheet metal or suitable castings which are carried by spokes or cross-bars extending radially from the axial shaft in such manner as to form a spirally-extending band surrounding a central aperture. Blades of alternately two different kinds may be used. The blades of the first kind are in such case so shaped that their outer edges are close to the inner wall of the trough and parallel thereto; the outline of these edges consequenly coinciding with the circumference of the greatest cylindrical arc formed by the mixing trough. The inner edges of the blades of this kind are suitably made to follow a profile increasingly approaching the outer edges in such manner as to leave a crescent-shaped inner space within the sectors occupied by the successive blades. The blades of the second kind are so shaped that their outer edges form a profile increasingly diverging from the surface of the trough, from beginning to end of the blade, in the direction of rotation in such manner that in the sectors occupied by these blades an outer, crescent-shaped space is left in the band forming the screw or worm. By arranging the two kinds of blades alternately in succession a spiral band is thus obtained having alternate, outer and inner, crescent-shaped cutouts.

The individual start or threads of this double worm are built up of the two kinds of blades described above in such manner that the respectively opposite elements of the multiple worm are formed by blades of the two different kinds. If, therefore, a blade with external crescent-shaped cutout is provided in the first start or thread of the worm the corresponding sector of the second start or thread must have a blade of the second kind, the outer edge of which is parallel to the side of the trough. Every part of the inner wall of the trough is thus swept by a blade which is nearly in contact with it, in such manner that the mixture being prepared, can nowhere accumulate, become trapped or form incrustations.

The invention will now be described with reference to the accompanying diagrammatic drawings in which—

Figure 1:
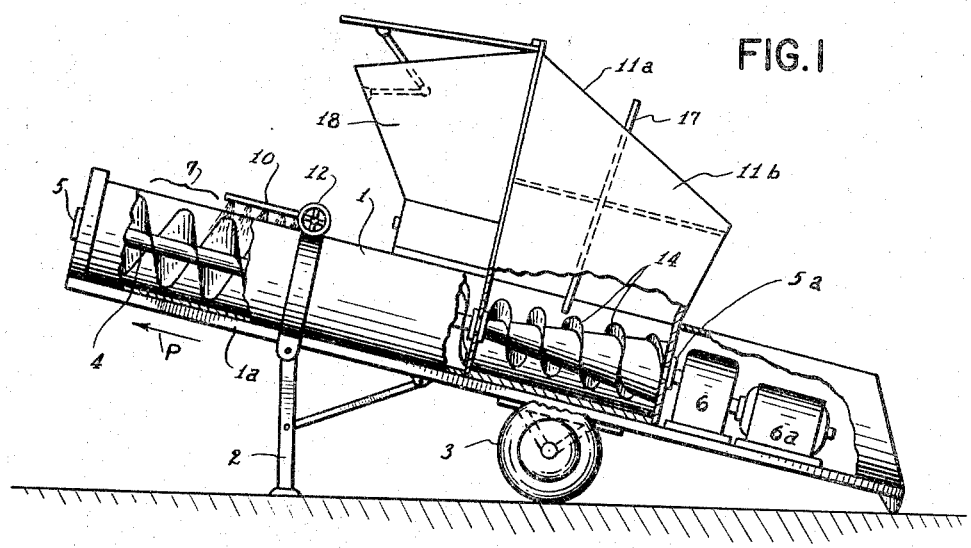
Figure 1 shows in partly sectional elevation a mixing machine made in accordance with the invention.

The carrier beam 1a in the operation of the machine is supported on the undercarriage 3, and on the collapsible strut 2, in such manner that the mixing trough 1 is in an inclined position. The mixing trough 1 contains the main shaft 4 which is journalled in the bearings. 5 and 5a and carries the double mixing worm 7. The materials to be mixed, which are disposed in the bins or hoppers 11a and 11b separated by the partition 17, are fed to the mixing trough by the conveyor worm 14, suitably having a tapered or conical core, and driven together with the main shaft 4 by the motor 6a through the gearing 6. In order to use this machine for mixing concrete, a cement hopper 18 is provided, in addition to the bins 11a and 11b, which are then filled with sand and gravel respectively, and from which the cement is delivered through a feeder 19 directly into the mixing trough 1. The water supply is taken care of by means of the pipe 10 equipped with a series of nozzles and regulated by the valve 12.

Figure 2:
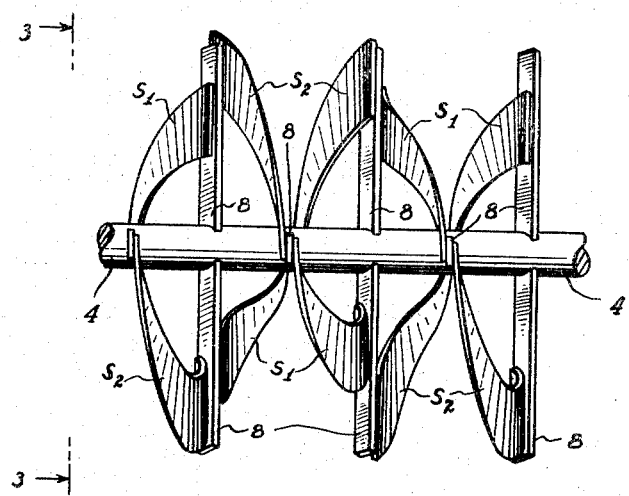
Figure 2 is an enlarged perspective elevational view of the mixing screw 7 of Fig. 1.
Figure 3:
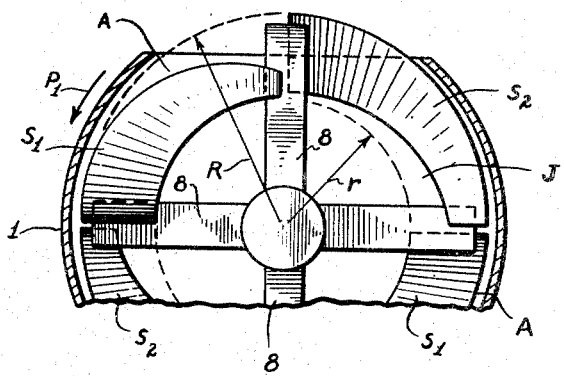
Figure 3 illustrates an end view of this screw or worm in the cross-section III—III of Fig. 2.

As will be seen, the mixing screw or worm 7 is a double worm comprising two turns or threads disposed in the fashion of a double helix. The term "double helix" as used in the specification and claims is intended to define helices extending in the same direction and not oppositely to each other. The perspective elevation of such a mixing worm 7 is shown in Fig. 2 on a larger scale. It is composed of generally horn or crescent shaped blades of two kinds, $S_1$ and $S_2$, each extending over an arc of 90° and welded to the alternately angularly displaced spokes 8 extending from the shaft 4. As will be seen from Fig. 3, the radially positioned outer edges of the blades $S_2$ follow the radially widest portion of the worm as determined by the radius R, while on the radially inner edges they leave a tapering, crescent-shaped opening or cutout J, bounded by the smallest circle determined by the radius $r$. The inner edges of the blades $S_1$, on the other hand, approximately follow the periphery of the circle of least radius $r$ of the worm, while their outer edges leave a tapering, crescent-shaped opening A. The openings or cutouts J and A are not necessarily bounded by circular arcs, as shown for convenience of representation. It is, however, important that the rotation of the worm takes place in the direction of the arrow $P_1$, in such manner that the tapering ends of the crescent-shaped cutouts A and J point forward in the direction of rotation.

The two parts of the double worm are indicated in Fig. 2 by horizontal and vertical shading, respectively. As will be seen, the individual blades are arranged in such manner that each blade $S_1$ in the one part is followed by a blade $S_2$ in the other part, and vice versa.

I claim:

1. A mixing device, comprising, in combination, an elongated mixing trough; a rotatable shaft extending through said mixing trough along the longitudinal axis thereof; means for rotating said rotatable shaft; and a pair of coaxial helical blade means arranged on said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, whereby the annular peripheral spaces defined within said trough by the rotation of the cut-out outer edge portions of each helical blade means are swept by continuous outer edge portions of the other helical blade means during rotation thereof.

2. A mixing device, comprising, in combination, an elongated part-cylindrical mixing trough; a rotatable shaft extending through said mixing trough along the longitudinal axis thereof; means for rotating said rotatable shaft; and a pair of coaxial helical blade means arranged on said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, whereby the annular peripheral spaces defined within said trough by the rotation of the cut-out outer edge portions of each helical blade means are swept by continuous outer edge portions of the other helical blade means during rotation thereof.

3. A mixing device, comprising, in combination, an elongated mixing trough; a rotatable shaft extending through said mixing trough along the longitudinal axis thereof; means for rotating said rotatable shaft; and a pair of coaxial helical blade means arranged on said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in some of which one of said helical blade means has a blade section having a continuous outer edge equidistant from said shaft and the other helical blade means has a blade section having a cut-out outer edge portion extending at least partially along said zone, each of said blade means having cut-out portions arranged so as not to axially overlap the cut-out portions of the other blade means, and in others of which the other helical blade means has a blade section having a continuous outer edge equidistant from said shaft and said one helical blade means has a blade section having a cut-out edge portion, whereby the annular peripheral spaces defined within said trough by the rotation of the cut-out outer edge portions of each helical blade means are swept by continuous outer edge portions of the other helical blade means during rotation thereof.

4. A mixing device, comprising, in combination, an elongated mixing trough; a rotatable shaft extending through said mixing trough along the longitudinal axis thereof; means for rotating said rotatable shaft; and a pair of coaxial helical blade means arranged on said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, each of said helical blade means being open centrally thereof along said shaft, whereby the annular peripheral spaces defined within said trough by the rotation of the cut-out outer edge portions of each helical blade means are swept by continuous outer edge portions of the other helical blade means during rotation thereof.

5. A mixing device, comprising, in combination, an elongated mixing trough; a rotatable shaft extending through said mixing trough along the longitudinal axis thereof, said shaft having radially extending spokes spaced therealong; means for rotating said rotatable shaft; and a pair of coaxial helical blade means mounted on said spokes of said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, whereby the annular peripheral spaces defined within said trough by the rotation of the cut-out outer edge portions of each helical blade means are swept by continuous outer edge portions of the other helical blade means during rotation thereof.

6. A mixing device, comprising, in combination, an elongated mixing trough; a rotatable shaft extending through said mixing trough along the longitudinal axis thereof, said shaft having radially extending spokes spaced therealong; means for rotating said rotatable shaft; and a pair of coaxial helical blade means mounted on said spokes of said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, each of said blade sections being arcuate and being spaced radially from said shaft and each extending over an arc of approximately 90°, whereby the annular peripheral spaces defined within said trough by the rotation of the cut-out outer edge portions of each helical blade means are swept by continuous blade portions of the other helical blade means during rotation thereof.

7. A mixing device, comprising, in combination, an elongated mixing trough; a rotatable shaft extending through said mixing trough along the longitudinal axis thereof, said shaft having radially extending spokes spaced therealong; means for rotating said rotatable shaft; and a pair of coaxial helical blade means mounted on said spokes of said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, each of said blade sections being arcuate and being spaced radially from said shaft and each extending over an arc of approximately 90°, the outer edges of axially alternating ones of said arcuate blade sections of each helical blade means curving inwardly away from the inner surface of said trough to form said cut-out portions, each of said helical blade means having cut-out outer edge portions arranged so as not to axially overlap the cut-out outer edge portions of the other helical blade means, whereby the annular peripheral spaces defined within said trough by the rotation of the cut-out outer edge portions of each helical blade means are swept by continuous outer edge portions of the other helical blade means during rotation thereof.

8. A mixing device, comprising, in combination, an elongated mixing trough; a rotatable shaft extending through said mixing trough along the longitudinal axis thereof, said shaft having radially extending spokes spaced therealong; means for rotating said rotatable shaft; and a pair of coaxial helical blade means mounted on said spokes of said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical means has a blade section having a cut-out outer edge portion, each of said blade sections being arcuate and being spaced radially from said shaft, the outer edges of axially alternating ones of said arcuate blade sections of each blade means curving inwardly away from the inner surface of said trough to form said cut-out portions, and the inner edges of the remaining arcuate blade sections curving outwardly away from said shaft, each of said helical blade means having cut-out outer edge portions arranged so as not to axially overlap the cut-out outer edge portions of the other helical blade means, whereby the annular peripheral spaces defined within said trough by the rotation of the cut-out outer edge portions of each helical blade means are swept by continuous outer edge portions of the other helical blade means during rotation thereof.

9. A mixing device, comprising, in combination, an elongated mixing trough; a rotatable shaft extending through said mixing trough along the longitudinal axis thereof, said shaft having radially extending spokes spaced therealong; means for rotating said rotatable shaft in a predetermined direction; and a pair of coaxial helical blade means mounted on said spokes of said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in each of which one of said helical blade means has a blade section having a continuous outer edge equidistant from said shaft and the other helical blade means has a blade section having a cut-out outer edge portion, each of said blade sections being arcuate and being spaced radially from said shaft, the outer edges of axially alternating ones of said arcuate blade sections of each helical blade means curving inwardly away from the inner surface of said trough to form said cut-out portions, the thus-formed wider ends of said arcuate blade sections being the leading ends during rotation thereof in said predetermined direction, each of said helical blade means having cut-out outer edge portions arranged so as not to axially overlap the cut-out outer edge portions of the other helical blade means, whereby the annular peripheral spaces defined within said trough by the rotation of the cut-out outer edge portions of each helical blade means are swept by continuous outer edge portions of the other helical blade means during rotation thereof.

10. A mixing device, comprising, in combination, an elongated mixing trough; support means holding said trough inclined away from a horizontal position so that said trough has an upper end and a lower end; means for feeding material to be mixed into the lower end of said trough; a rotatable shaft extending through said mixing trough along the longitudinal axis thereof; means for rotating said rotatable shaft; and a pair of coaxial helical blade means arranged on said rotatable shaft in the form of a double helix and extending radially from said shaft toward said mixing trough with the peripheries thereof closely adjacent to the inner surface of said mixing trough, said double helix formed by said pair of coaxial helical blade means having axially consecutive helix sections, in some of which one of said helical blade means has a blade section having a continuous outer edge equidistant from said shaft and the other helical blade means has a blade section having a cut-out outer edge portion extending at least partially along said zone, each of said blade means having cut-out portions arranged so as not to axially overlap the cut-out portions of the other blade means, and in others of which the other helical blade means has a blade section having a continuous outer edge equidistant from said shaft and said one helical blade means has a blade section having a cut-out edge portion, whereby the annular peripheral spaces defined within said trough by the rotation of the cut-out outer edge portions of each helical blade means are swept by continuous outer edge portions of the other helical blade means during rotation thereof.

11. A mixing device, comprising, in combination, an elongated mixing trough; a rotatable shaft extending through said mixing trough along the longitudinal axis thereof; means for rotating said rotatable shaft; and a plurality of coaxial helical blade means arranged on said rotatable shaft in the form of a multiple helix and extending radially from said shaft toward said mixing trough with the peripheries thereof closely adjacent to the inner surface of said mixing trough, said multiple helix including a pair of coaxial helical blade means having axially consecutive helix sections, in each of which one of said helical blade means has a blade section having a continuous outer edge substantially equidistant from said shaft and the other helical blade means has a blade section having a cut-out outer edge portion, whereby the annular peripheral spaces defined within said trough by the rotation of the cut-out outer edge portions of each helical blade means are swept by continuous outer edge portions of the other helical blade means during rotation thereof.

12. A mixing device, comprising, in combination, an elongated mixing trough; a rotatable shaft extending through said mixing trough along the longitudinal axis thereof, said shaft having radially extending spokes spaced therealong; means for rotating said rotatable shaft; and a plurality of coaxial helical blade means mounted on said spokes of said rotatable shaft in the form of a multiple helix and extending radially from said shaft toward said mixing trough with the peripheries thereof closely adjacent to the inner surface of said mixing trough, said multiple helix including a pair of coaxial helical blade means having axially consecutive helix sections, in each of which one of said helical blade means has a blade section having a continuous outer edge substantially equidistant from said shaft and the other helical blade means has a blade section having a cut-out outer edge portion, whereby the annular peripheral spaces defined within said trough by the rotation of the cut-out outer edge portions of each helical blade means are swept by continuous outer edge portions of the other helical blade means during rotation thereof.

References Cited in the file of this patent

UNITED STATES PATENTS

| | | |
|---|---|---|
| 934,603 | Gedge | Sept. 21, 1909 |
| 1,960,692 | Brown et al. | May 29, 1934 |
| 2,241,425 | Schmidt | May 13, 1941 |

FOREIGN PATENTS

| | | |
|---|---|---|
| 20,157 | Great Britain | Oct. 22, 1894 |